D. D. O'BRIEN.
TIRE PROTECTOR.
APPLICATION FILED APR. 15, 1916.
1,340,179.
Patented May 18, 1920.
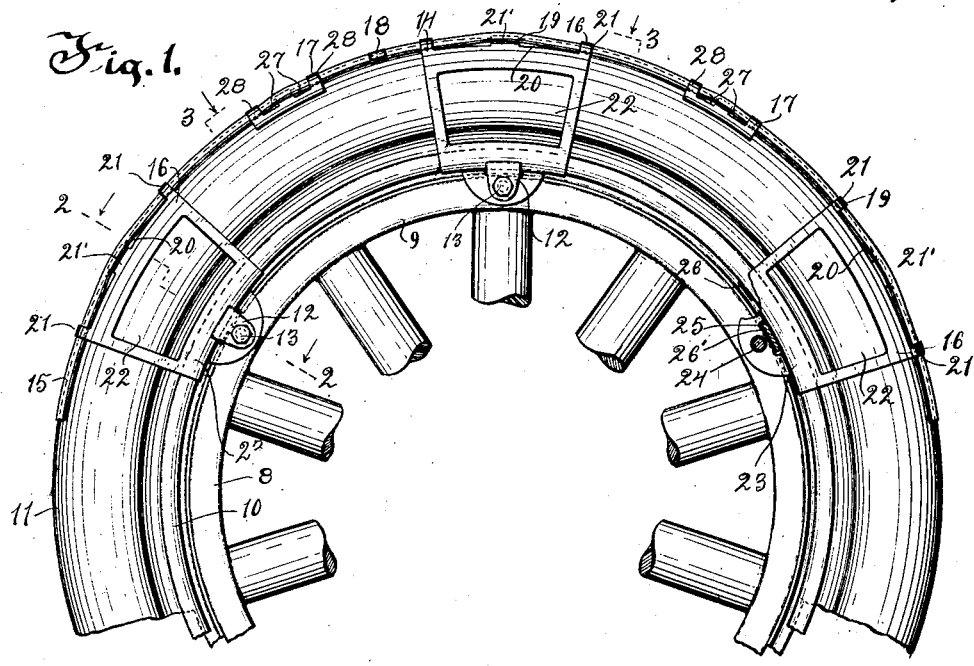
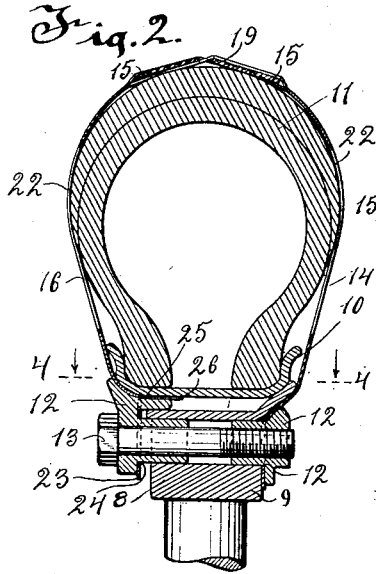
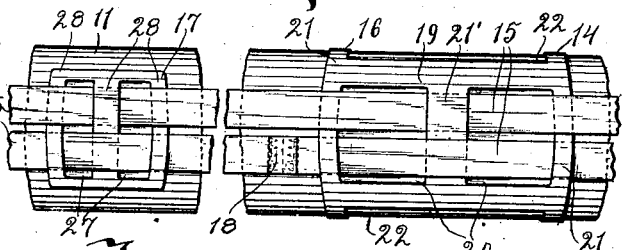
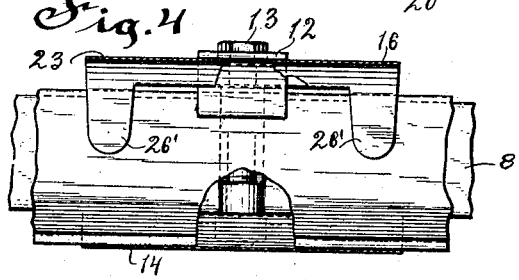
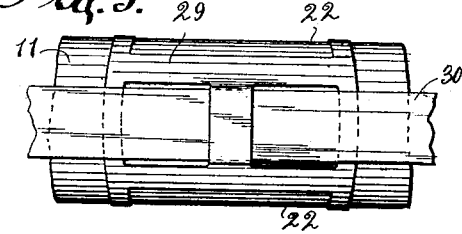
INVENTOR
Daniel D. O'Brien
By Morsell, Keeney & French,
ATTORNEYS

UNITED STATES PATENT OFFICE.

DANIEL D. O'BRIEN, OF WAUKESHA, WISCONSIN.

TIRE-PROTECTOR.

1,340,179. Specification of Letters Patent. Patented May 18, 1920.

Application filed April 15, 1916. Serial No. 91,276.

*To all whom it may concern:*

Be it known that I, DANIEL D. O'BRIEN, a citizen of the United States, and resident of Waukesha, in the county of Waukesha and State of Wisconsin, have invented new and useful Improvements in Tire-Protectors, of which the following is a description, reference being had to the accompanying drawings, which are a part of this specification.

This invention relates to improvements in a tire protector more particularly adapted for use in connection with automobile wheels and tires.

It is one of the objects of the present invention to provide a tire protector which may be fastened to an automobile wheel of ordinary construction to relieve the tire of said wheel of the greater part of the ordinary wear of said tire.

A further object of the invention is to provide a tire protector in which a band of steel, leather or other material may be mounted on an automobile wheel in such a manner as to guard and protect the tire thereof without rigidly connecting the band to the wheel.

A further object of the invention is to provide a tire protector having an attaching means which may be connected to the modern type of automobile wheel without the necessity of drilling, cutting or otherwise marring the wheel.

A further object of the invention is to provide a tire protector which is of simple construction, is strong and durable and is well adapted for the purpose described.

With the above and other objects in view the invention consists of the improved tire protector and its parts and combinations as set forth in the claims, and all equivalents thereof.

In the accompanying drawing in which the same reference characters indicate the same parts in all of the views:

Figure 1 is a side view of a portion of an automobile wheel and tire with a portion of the improved tire protector mounted thereon.

Fig. 2 is a transverse sectional view thereof taken on line 2—2 of Fig. 1;

Fig. 3 is a top view on a larger scale of a portion of the wheel and protector;

Fig. 4 is a sectional view of the guard taken on line 4—4 of Fig. 2 upper portions of the wheel also being shown; and Fig. 5 is a top view of a modified form of guard.

Referring to the drawing the numeral 8 indicates an automobile wheel of the demountable rim type, 9 the felly or rim, 10 the demountable rim and 11 the pneumatic tire mounted thereon. In wheels of this type the demountable rim 10 is usually held in position by locking plates 12 which are secured to the felly by bolts 13 and these bolts are used to also secure the tire protector 14 to the wheel.

The improved protector comprises the guard bands 15, the holding members 16 and the intermediate spacing members 17. The protector bands are preferably formed of flexible steel strips having their adjacent ends abutting and laced together by metal belt couplings 18 but may be formed of leather or any other bendable or yielding material desired. Two of the bands are preferably used but the invention contemplates the use of one or more.

The holding members 16 are formed of resilient sheet metal of approximately U-shape in cross section to conform to the cross sectional shape of the tire around which they extend. The tread portions 19 of the holding members are formed with openings 20 to provide transversely extending strap portions 21 and 21' to permit the interlacing of the bands 15 through said openings 20 and alternately above and beneath the strap portions 21 and 21' in staggered relation with respect to each other. Opposite side portions of the holding members are formed with side openings 22 to lessen the weight of the members and to permit the easy flexing of the said side portions.

The opposite inner end portions 23 of the holding members are provided with bolt openings 24 to receive the rim bolts 13 which fasten said holding members to the rim. The said end portions are interposed between the side portions of the rim and the locking plates 12, and in the form of locking plate shown the side portions 23 are provided with openings 25 to permit the inwardly extending wedge projections 26 formed on some of said plates to extend through said openings.

In order to prevent the tilting of the holding members circumferentially with relation to the wheel the holding members on one side and adjacent their end edges are provided with inwardly extending tongues 26' which project between the tire and the rim and firmly hold said members in position. The bolts thread into the plates on one side of the rim.

Between the holding members the spacing members 17 are positioned and comprise rectangular pieces of sheet metal having transverse slits 27 through which the protector bands pass and are alternately interlaced in staggered relation above and below the transverse strip portions 28 thereof in the same manner as the holding members.

These spacing members 17 are not directly fastened to the wheel rim and merely serve to space the bands laterally and to prevent their overlapping and may be omitted if desired.

The modified form shown in Fig. 5 illustrates a holding member 29 for securing a single band 30 to the rim.

In use the protector bands will relieve tires of the major portion of the wear and thus prolong the life of the tire, and when the bands become worn they may be easily replaced.

It will also be noted that the construction permits the bands to creep on the tire and thus will prevent buckling of the bands.

From the foregoing description it will be seen that the resilient tire protector is well adapted for the purpose described.

What I claim as my invention is:

1. A resilient tire protector, comprising U-shaped holding members provided with tread openings, a protector band extending loosely and circumferentially movable through the openings, and means for attaching the holding members to a wheel rim.

2. A resilient tire protector, comprising a plurality of holding members, a protector band loosely connected thereto adjacent the tread portion and circumferentially movable therethrough, and means for attaching the holding members to a wheel rim.

3. A resilient tire protector, comprising a plurality of holding members having transversely extending strap portions and tread openings therebetween, a protector band loosely and circumferentially movably interlaced through said openings and alternately above and below said strap portions, and means for attaching said holding members to a wheel rim.

4. A resilient tire protector, comprising a plurality of holding members having transversely extending strap portions and tread openings therebetween, protector bands interlaced through said openings and alternately above and below said strap portions in staggered relation, spacing members interlaced on said bands between the holding members, and means for attaching said holding members to a wheel rim.

In testimony whereof, I affix my signature.

DANIEL D. O'BRIEN.